US008738374B2

(12) United States Patent
Jaroker (10) Patent No.: US 8,738,374 B2
(45) Date of Patent: May 27, 2014

(54) SYSTEM AND METHOD FOR THE SECURE, REAL-TIME, HIGH ACCURACY CONVERSION OF GENERAL QUALITY SPEECH INTO TEXT

(75) Inventor: Jon Jaroker, New York, NY (US)

(73) Assignee: j2 Global Communications, Inc., Los Angeles, CA (US)

( * ) Notice: Subject to any disclaimer, the term of this patent is extended or adjusted under 35 U.S.C. 154(b) by 476 days.

(21) Appl. No.: 12/471,283

(22) Filed: May 22, 2009

(65) Prior Publication Data

US 2009/0292539 A1 Nov. 26, 2009

Related U.S. Application Data

(63) Continuation of application No. 10/910,723, filed on Aug. 3, 2004, now Pat. No. 7,539,086, which is a continuation-in-part of application No. 10/280,302, filed on Oct. 23, 2002, now Pat. No. 6,816,834.

(51) Int. Cl.
*G10L 15/26* (2006.01)
*G10L 15/00* (2013.01)
*G10L 15/04* (2013.01)

(52) U.S. Cl.
USPC ............ 704/235; 704/231; 704/236; 704/251

(58) Field of Classification Search
USPC ................. 704/1–8, 200, 201, 203, 206–210, 704/231–236, 243–245, 258, 260, 270, 275, 704/278; 369/1–5, 24.01–30.01, 369/47.1–47.13, 68–69, 86–92; 709/201–202, 204–207, 223–226, 709/238–246, 249
See application file for complete search history.

(56) References Cited

U.S. PATENT DOCUMENTS 3,660,616 A 5/1972 Davidge et al.
3,671,683 A 6/1972 Rahenkamp et al.
(Continued)

FOREIGN PATENT DOCUMENTS

EP 0905679 A2 3/1999
WO WO-02/075724 A1 9/2002

OTHER PUBLICATIONS

Smith et al. "Low distrubance Audio for Awareness and Privacy in Media Space Applications." ACM Multimedia 95—Electronic Proceedings. Nov. 5-9, 1995. San Francisco, CA.*

(Continued)

*Primary Examiner* — Pierre-Louis Desir
*Assistant Examiner* — David Kovacek
(74) *Attorney, Agent, or Firm* — Blakely, Sokoloff, Taylor & Zafman LLP (57) ABSTRACT

Described is a speech-to-text conversion system and method that provides secure, real-time and high-accuracy conversion of general-quality speech into text. The system is designed to interface with external devices and services, providing a simple and convenient manner to transcribe audio that may be stored elsewhere such as a wireless phone's voice mail, or occurring between two or more parties such as a conference call. The first step in the system's process ensures secure and private transcription by separating an audio stream into many audio shreds, each of which has duration of only a few seconds and cannot reveal the context of the conversation. A workforce of geographically distributed transcription agents who transcribe the audio shreds is able to generate transcription in real time, with many agents working in parallel on a single conversation. No one agent (or group of agents) receives a sufficient number of audio shreds to reconstruct the context of any conversation. The use of human transcribers allows the system to overcome limitations typical of computer-based speech recognition and permits accurate transcription of general-quality speech even in acoustically hostile environments.

20 Claims, 5 Drawing Sheets

(56) References Cited

U.S. PATENT DOCUMENTS

| | | | |
|---|---|---|---|
| 4,318,125 A | 3/1982 | Shutterly | |
| 4,375,083 A * | 2/1983 | Maxemchuk | 704/278 |
| 4,430,726 A * | 2/1984 | Kasday | 704/235 |
| 4,468,751 A | 8/1984 | Plunkett, Jr. | |
| 4,623,988 A * | 11/1986 | Paulson et al. | 714/47.3 |
| 4,712,240 A | 12/1987 | Schnerk | |
| 4,794,474 A * | 12/1988 | Dwyer et al. | 360/72.2 |
| 4,805,219 A | 2/1989 | Baker et al. | |
| 4,817,127 A * | 3/1989 | Chamberlin et al. | 379/88.11 |
| 4,908,866 A * | 3/1990 | Goldwasser et al. | 704/201 |
| 5,127,003 A * | 6/1992 | Doll et al. | 370/259 |
| 5,428,707 A * | 6/1995 | Gould et al. | 704/231 |
| 5,440,662 A * | 8/1995 | Sukkar | 704/236 |
| 5,465,240 A * | 11/1995 | Mankovitz | 369/1 |
| 5,479,488 A * | 12/1995 | Lennig et al. | 379/88.04 |
| 5,500,920 A * | 3/1996 | Kupiec | 704/270.1 |
| 5,526,407 A * | 6/1996 | Russell et al. | 379/88.01 |
| 5,600,756 A * | 2/1997 | Ely | 704/235 |
| 5,613,909 A | 3/1997 | Stelovsky | |
| 5,655,058 A | 8/1997 | Balasubramanian et al. | |
| 5,659,662 A | 8/1997 | Wilcox et al. | |
| RE35,738 E * | 2/1998 | Woo et al. | 715/788 |
| 5,761,637 A * | 6/1998 | Chino | 704/231 |
| 5,812,882 A * | 9/1998 | Raji et al. | 710/72 |
| 5,823,948 A * | 10/1998 | Ross et al. | 600/300 |
| 5,848,388 A | 12/1998 | Power et al. | |
| 5,850,561 A * | 12/1998 | Church et al. | 715/234 |
| 5,855,000 A * | 12/1998 | Waibel et al. | 704/235 |
| 5,862,519 A | 1/1999 | Sharma et al. | |
| 5,883,986 A * | 3/1999 | Kopec et al. | 382/310 |
| 5,884,256 A | 3/1999 | Bennett et al. | |
| 5,956,668 A | 9/1999 | Alshawi et al. | |
| 6,055,495 A | 4/2000 | Tucker et al. | |
| 6,076,059 A | 6/2000 | Glickman et al. | |
| 6,081,780 A * | 6/2000 | Lumelsky | 704/260 |
| 6,122,614 A | 9/2000 | Kahn et al. | |
| 6,151,571 A * | 11/2000 | Pertrushin | 704/209 |
| 6,151,576 A * | 11/2000 | Warnock et al. | 704/260 |
| 6,173,259 B1 | 1/2001 | Bijl et al. | |
| 6,223,155 B1* | 4/2001 | Bayya | 704/243 |
| 6,243,676 B1 | 6/2001 | Witteman | |
| 6,263,507 B1 | 7/2001 | Ahmad et al. | |
| 6,278,772 B1 | 8/2001 | Bowater et al. | |
| 6,279,018 B1* | 8/2001 | Kudrolli et al. | 715/234 |
| 6,289,304 B1* | 9/2001 | Grefenstette | 704/9 |
| 6,324,512 B1* | 11/2001 | Junqua et al. | 704/275 |
| 6,332,122 B1 | 12/2001 | Oretega et al. | |
| 6,366,882 B1 | 4/2002 | Bijl et al. | |
| 6,442,517 B1* | 8/2002 | Miller et al. | 704/201 |
| 6,513,003 B1 | 1/2003 | Angell et al. | |
| 6,535,848 B1 | 3/2003 | Ortega et al. | |
| 6,578,007 B1* | 6/2003 | Howes et al. | 705/7.22 |
| 6,636,238 B1 | 10/2003 | Amir et al. | |
| 6,665,641 B1* | 12/2003 | Coorman et al. | 704/260 |
| 6,754,181 B1* | 6/2004 | Elliott et al. | 370/252 |
| 6,766,294 B2 | 7/2004 | MacGinite et al. | |
| 6,775,651 B1* | 8/2004 | Lewis et al. | 704/235 |
| 6,816,834 B2 | 11/2004 | Jaroker | |
| 6,850,609 B1 | 2/2005 | Schrage | |
| 6,880,171 B1 | 4/2005 | Ahmad et al. | |
| 6,985,147 B2* | 1/2006 | Asakawa et al. | 345/467 |
| 7,003,456 B2 | 2/2006 | Gillick et al. | |
| 7,006,967 B1 | 2/2006 | Kahn et al. | |
| 7,016,844 B2 | 3/2006 | Othmer et al. | |
| 7,035,804 B2 | 4/2006 | Saindon et al. | |
| 7,076,427 B2* | 7/2006 | Scarano et al. | 704/270 |
| 7,076,436 B1* | 7/2006 | Ross et al. | 705/3 |
| 7,139,752 B2* | 11/2006 | Broder et al. | 1/1 |
| 7,379,867 B2* | 5/2008 | Chelba et al. | 704/236 |
| 7,539,086 B2* | 5/2009 | Jaroker | 369/25.01 |
| 7,822,598 B2* | 10/2010 | Carus et al. | 704/9 |
| 7,831,425 B2* | 11/2010 | Acero et al. | 704/251 |
| 8,006,307 B1* | 8/2011 | Klebe | 726/26 |
| 8,285,809 B2* | 10/2012 | McCue et al. | 709/217 |
| 2002/0002459 A1* | 1/2002 | Lewis et al. | 704/260 |
| 2002/0023020 A1* | 2/2002 | Kenyon et al. | 705/26 |
| 2002/0049589 A1* | 4/2002 | Poirier | 704/235 |
| 2002/0095290 A1* | 7/2002 | Kahn et al. | 704/260 |
| 2002/0138265 A1* | 9/2002 | Stevens et al. | 704/251 |
| 2002/0143533 A1* | 10/2002 | Lucas et al. | 704/235 |
| 2002/0144153 A1 | 10/2002 | LeVine | |
| 2002/0161579 A1 | 10/2002 | Saindon et al. | |
| 2002/0169611 A1* | 11/2002 | Guerra et al. | 704/270 |
| 2002/0188443 A1 | 12/2002 | Reddy et al. | |
| 2003/0004724 A1* | 1/2003 | Kahn et al. | 704/260 |
| 2003/0046350 A1 | 3/2003 | Chintalapati et al. | |
| 2003/0050777 A1* | 3/2003 | Walker, Jr. | 704/235 |
| 2003/0055634 A1* | 3/2003 | Hidaka et al. | 704/222 |
| 2003/0055640 A1* | 3/2003 | Burshtein et al. | 704/235 |
| 2003/0069759 A1* | 4/2003 | Smith | 705/3 |
| 2003/0139933 A1* | 7/2003 | Kimmel | 704/275 |
| 2004/0030704 A1* | 2/2004 | Stefanchik et al. | 707/100 |
| 2004/0064317 A1 | 4/2004 | Othmer et al. | |
| 2004/0083105 A1 | 4/2004 | Jaroker | |
| 2004/0117185 A1* | 6/2004 | Scarano et al. | 704/254 |
| 2005/0010407 A1* | 1/2005 | Jaroker | 704/235 |
| 2005/0216264 A1* | 9/2005 | Attwater et al. | 704/239 |
| 2006/0080107 A1* | 4/2006 | Hill et al. | 704/275 |
| 2006/0095423 A1* | 5/2006 | Reicher et al. | 707/3 |
| 2006/0100876 A1* | 5/2006 | Nishizaki et al. | 704/257 |
| 2006/0190249 A1* | 8/2006 | Kahn et al. | 704/235 |
| 2007/0135962 A1* | 6/2007 | Kawabe et al. | 700/225 |
| 2007/0179784 A1* | 8/2007 | Thambiratnam et al. | 704/255 |
| 2008/0270110 A1* | 10/2008 | Yurick et al. | 704/3 |
| 2009/0204399 A1* | 8/2009 | Akamine | 704/235 |
| 2009/0292539 A1* | 11/2009 | Jaroker | 704/235 |
| 2010/0010803 A1* | 1/2010 | Ishikawa et al. | 704/9 |

OTHER PUBLICATIONS

Non-Final Office Action (dated Apr. 4, 2008), U.S. Appl. No. 10/910,723, filed Aug. 3, 2004, First Named Inventor: Jon Jaroker, (28 pages).

Gauvain, J L., et al., "Speech-to-Text Conversion in French", International Journal of Pattern Recognition and Artificial Intelligence, Special Issue on Speech Recognition for Different Languages, Spring 1994, LIMSI-CNRS, Orsay cedex, France, (29 pages).

Penagarikano, Mikel, et al., "Speech-to-Text Translation by a Non-Word Lexical Unit Based System", Fifth International Symposium on Signal Processing and its Applications, ISSPA Aug. 22-25, 1999, Brisbane, Australia, (pp. 111-114).

Shahraray, Behzad, et al., "Pictorial Transcripts: Multimedia Processing Applied to Digital Library Creation", IEEE First Workshop on Multimedia Signal Processing, Jun. 23-25, 1997, (pp. 581-586).

* cited by examiner

Exemplary Data Structure

FIG. 5

SYSTEM AND METHOD FOR THE SECURE, REAL-TIME, HIGH ACCURACY CONVERSION OF GENERAL QUALITY SPEECH INTO TEXT

This application is a continuation of Ser. No. 10/910,723, filed on Aug. 3, 2004, entitled "System and Method for the Secure, Real-time, High Accuracy Conversion of General Quality Speech Into Text", now U.S. Pat. No. 7,539,086 which is a Continuation-in-Part of U.S. patent application Ser. No. 10/280,302, filed on Oct. 23, 2002 and entitled SYSTEM AND METHOD FOR SECURE REAL TIME HIGH ACCURACY SPEECH TO TEXT CONVERSION OF GENERAL QUALITY SPEECH, now U.S. Pat. No. 6,816,834.

BACKGROUND INFORMATION

Converting speech to text can be accomplished currently by several methods. Each method has different levels of accuracy, security, speed, tolerance of poor audio quality and price. Court reporters, or stenographers, for example, provide verbatim transcription but at a high price and with a time delay. Computer-based speech recognition is much less accurate, but is less expensive and instantaneous. Transcription of stored messages (such as voice mail) is more difficult for computer-based speech recognition technology to perform accurately due to poor audio quality. No current speech to text method provides the ideal combination of accuracy, security, speed and tolerance when transcribing general-quality speech.

Figure 1:
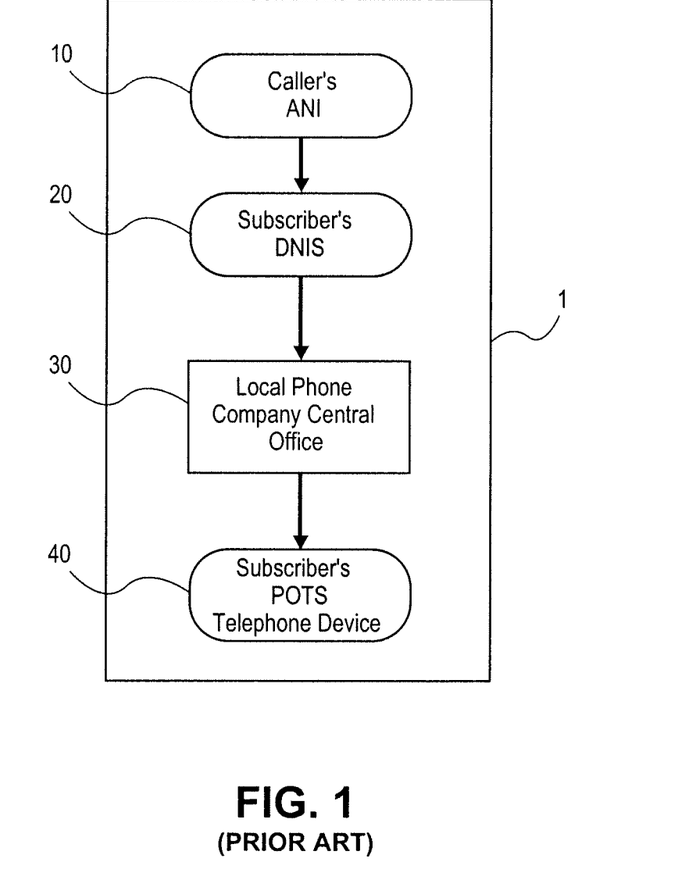
FIG. 1 depicts a traditional phone system.

Linking the speech to text conversion process to an existing communications service, such as a telephone system, makes the conversion simpler to achieve. Local telephone companies offer Call Forward on Busy ("CFB"), Call Forward on No Answer ("CFNA"), Call Forwarding ("CF"), Distinctive Ring and other services. FIG. 1 shows a traditional phone system 1 which may offer the services described above. When a user of the traditional phone system 1 places a call, the system has an Automatic Number Identification ("ANI") service 10 that identifies the number from which the call has been placed. Similarly, the traditional phone system 1 has a Dialed Number Identification Service ("DNIS") service 20 which identifies the number that the caller dialed. This information is received by the local phone company 30 and the call is directed to the receiving phone which is termed a Plain Old Telephone Service ("POTS") device 40.

SUMMARY OF THE INVENTION

A system, comprising an audio shredder receiving an audio segment, the audio segment being a portion of an audio stream, the audio shredder creating an audio shred from the audio segment, an audio mixer receiving the audio shred and randomizing the audio shred with other audio shreds from other audio streams and a plurality of transcribers, wherein one of the transcribers receives the audio shred and transcribes the audio shred into text.

In addition, a method, comprising the steps of receiving an audio stream, filtering the audio stream to separate identifiable words in the audio stream from unidentifiable words, creating a word text file for the identifiable words and storing the word text file in a database, the word text file including word indexing information. Creating audio segments from the audio stream, the audio segments including portions of the audio stream having unidentifiable words, creating audio shreds from the audio segments, the audio shreds including audio shred indexing information to identify each of the audio shreds and storing the audio shred indexing information in the database. Mixing the audio shreds with other audio shreds from other audio streams, delivering the audio shreds to a plurality of transcribers, transcribing each of the audio shreds into a corresponding audio shred text file, the audio shred text file including the audio shred indexing information corresponding to the audio shred from which the audio shred text file was created and reassembling the audio shred text files and the word text files into a conversation text file corresponding to the audio stream.

Furthermore, a system, comprising a service platform for receiving, processing and directing streaming audio and a user device connected to the service platform and configured to receive streaming audio from the service platform and transmit streaming audio to the service platform, the user device further configured to signal the service platform to begin a transcription of the streaming audio transmitted and received by the user device. The service platform including a filter receiving the streaming audio, identifying words within the streaming audio and creating a word text file corresponding to each of the identified words, the filter further creating audio segments from the streaming audio, the audio segments including portions of the audio stream having unidentifiable words, an audio shredder creating a plurality of audio shreds from each of the audio segments, an audio mixer randomizing the audio shreds with other audio shreds from other streaming audio, wherein the service platform delivers the randomized audio shreds to a plurality of transcribers which transcribe the audio shreds into audio shred text files corresponding to the audio shreds, and a reassembler creating a conversation text file corresponding to the streaming audio from the audio shred text files and the word text files.

A system, comprising an audio stream element including information corresponding to an audio stream, the information including a begin time of the audio stream, an end time of the audio stream, a conversation identification of the audio stream and the audio stream file, a word element including information corresponding to a word identified in the audio stream by a speech recognition filter, the information including an identification of the audio stream from which the word was identified, a begin time of the word, an end time of the word, an audio file of the word and text corresponding to the word, an audio segment element including information corresponding to an audio segment of the audio stream, the audio segment being a portion of the audio stream without identifiable words, the information including the identification of the audio stream from which the audio segment originates, the begin time of the audio segment, the end time of the audio segment and the audio file of the audio segment, an audio shred element including information corresponding to an audio shred of the audio segment, the information including an identification of the audio segment from which the audio shred originates, the begin time of the audio shred, the end time of the audio shred and the audio file of the audio shred and a text token element including information corresponding to a textual representation of the audio shred, the information including an identification of the audio shred from which the textual representation originates and the textual representation. The information included in each of the audio stream element, the word element, the audio segment element, the audio shred element and the text token element is processed to generate a text transcription of the audio stream.

A system for the management of a distributed workforce of speech to text transcribers, the testing and monitoring of these transcribers, and financial accounting system to pay these transcribers and set the equilibrium price at which demand for services matches supply.

A system for the capture of spoken conversations or retrieval of stored audio that is then processed by the platform for conversion to text.

DETAILED DESCRIPTION

Figure 2:
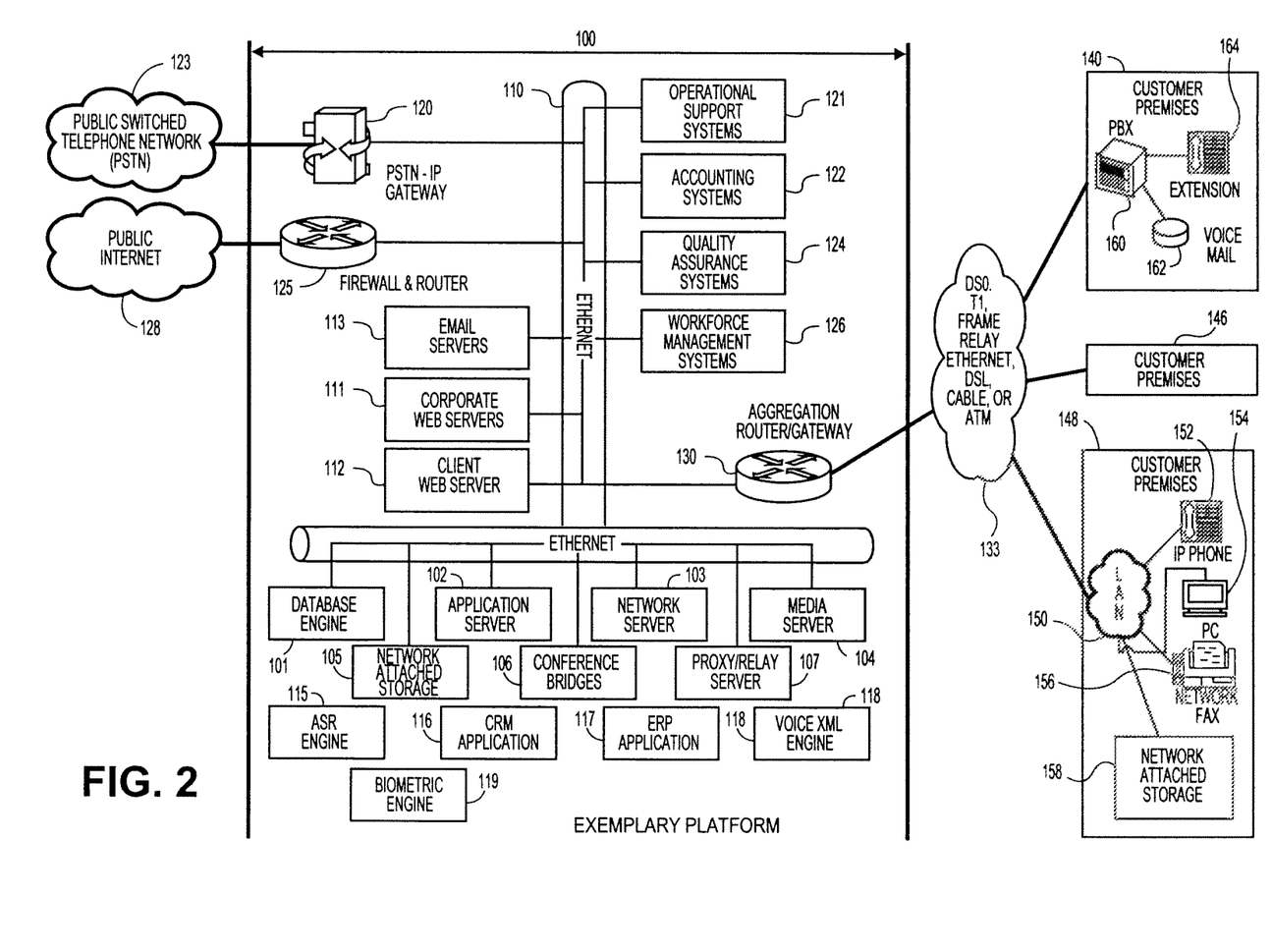
FIG. 2 shows an exemplary platform that may be used to implement the present invention.

The present invention may be further understood with reference to the following description and the appended drawings, wherein like elements are provided with the same reference numerals. FIG. 2 shows an exemplary platform 100 that may be used to implement the present invention. Those of skill in the art will understand that platform 100 is only exemplary and that the present invention may be implemented on numerous other platforms. The platform 100 components in FIG. 2 are shown between the two lines denoting that the platform 100 components may be located within the same facility. However, those of skill in the art will understand that the platform 100 components may be distributed to any physical location. In addition, it may also be considered that the components located at the customer premises locations 140-148 may also form part of the platform 100.

The platform 100 includes a series of general purpose servers 101-107 which perform specific functions to deliver resources to the users of the platform 100. The resources include database services provided by database server 101, applications provided by application server 102, network services provided by network server 103, media services provided by media server 104, data storage provided by network attached storage 105, conferences services provided by conference bridges 106 and call relay services provided by relay/proxy server 107. For example, the application server 102 may contain all the call control applications for the platform 100 to manage phone calls. The application server 102 may request resources from the other servers and/or hand off calls to the other servers based on the resource needed to handle the call. Those of skill in the art will understand that these resources and the providing servers are only exemplary, additional servers and/or resources may be added to the platform 100 as needed.

The servers 101-107 are connected to each other and to the remaining components of the platform 100 via an Ethernet 110 (or any other data pipeline) which provides fast and reliable communication between platform components. Other services provided by the platform 100 may include electronic mail ("email") services via email server 113, corporate and client web services via corporate web server 111 and client web server 112. The platform 100 may also include an automatic speech recognition ("ASR") engine 115, customer relationship management ("CRM") applications 116, enterprise resource planning ("ERP") applications 117, voice markup language ("Voice XML") engine 118 and a biometric engine 119. All of the above resources, services and applications are used to provide services to subscribers via the PSTN 123 or direct network connections 133. Those of skill in the art are familiar with the types of services and functions provided by these resources.

Servers comprising the operational support systems (OSS) 121 are used to monitor the health and security of the platform 100. Such systems include performance monitoring, record keeping and provisioning. Those of skill in the art will understand that these systems are only exemplary, additional OSS resources may be added to the platform 100 as needed.

Servers comprising the accounting systems 122 keep track of commissions earned by the transcribers and deduct fees from subscribers' accounts. The accounting system 122 may bill subscribers, and pay commissions to transcribers, at a per-word or per-line rate, by metering minutes-of-use or at a flat-rate subscription. The accounting system 122 may also vary the commissions and fees according to the supply and demand of specific services. The accounting systems 122 may continually calculate an equilibrium price at which demand for transcription services matches the supply of those services. The accounting systems 122 also provides a mechanism for dispute resolution where a subscriber may claim a credit for inaccurately transcribed words, the transcriber would be charged back his commission for this error, but the transcriber may dispute the chargeback if the word were inaudible. The accounting systems 122 may also increase a transcriber's commission based on several factors, such as specific skills, availability, accuracy, productivity and/or tenure.

Servers comprising the quality assurance systems 124 continually monitor the accuracy and speed of transcribers. This quality assurance system 124 may also be used to test new transcribers for speed and accuracy as well as report the transcriber's accuracy and speed in real time and assign a skill level to the transcriber.

Servers comprising the workforce management systems 126 are used to schedule, monitor, authenticate, and distribute work tasks to transcribers. The workforce management systems 126 keep track of the transcribers' presence in order to add or remove individuals from the work process conducted by platform 100. As transcribers join or leave the workforce, their skills are automatically added or removed from the available resources of platform 100. The workforce management systems 126 communicate with the accounting systems 122 to dynamically adjust commissions paid to transcribers in order to provide more or less incentive for transcribers to join or leave the system depending on demand. In cases where demand exceeds supply, the workforce management systems 126 may contact off-duty transcribers by email, telephone call, pager or other means, to invite them to join the workforce. The workforce management systems 126 keep track of each transcriber's skills and foreign language ability in order to invite that transcriber to join when demand for those abilities exceeds supply. The workforce management systems 126 are used by the application server 102 to distribute work to the various transcribers. The workforce management systems 126 employ heuristic learning to identify which group of transcribers is most accurate and/or efficient at transcribing audio from a particular class of speakers (as further defined below).

The platform 100 may also include a PSTN-IP gateway 120 which receives phone calls directed for the users 140-148 from the public switched telephone network ("PSTN") 123. Gateway 120 can also be used to place outbound telephone calls to the PSTN. These outbound telephone calls can be placed by the users 140-148 or under direction of the Application Server 102. The phone calls directed from and to the PSTN 123 may be in the form of analog signals which are converted to digital signals by the PSTN-IP Gateway 120. The conversion of analog signals to digital signals (e.g., data packets) is well known in the art. In the area of telephony, the concept of transmitting voice data in the form of data packets may be referred to as Voice over Internet Protocol ("VoIP"). Throughout this description, the platform for processing and transmitting these data packets may be referred to as VoIP platforms, but those of skill in the art will understand that the Internet Protocol is only one example of a protocol which may be used to transmit data over a network and the present invention may be implemented using any protocol for data packet or voice transmission.

Data packets are distributed across the platform 100 via the Ethernet 110 (or similar data network). The resources of the platform 100 perform the necessary processing on the data packets and the phone call (in the form of data packets) can be directed via aggregation router or gateway 130 to the correct user 140-148. The type of processing performed by the platform 100 resources depends on the services provided by the platform 100 and the services for which each user 140-148 has contracted. Examples of features and services will be described in greater detail below.

The connection from the user 140-148 locations and the platform location may be via any fast and reliable communication link 133, for example, a DSO circuit, T1 circuit, a frame relay network, metropolitan Ethernet, DSL, cable, an asynchronous transfer mode ("ATM") network, etc. The individual links to users 140-148 (e.g., T1 links) may be combined into a single digital link (e.g., a DS3 link) between the aggregation router/gateway 130 and the communication link 133. The data being sent across the single digital link may need to be converted to or from VoIP or multiplexed or de-multiplexed based on the direction of the network traffic and the type of link used; and, these functions may be carried out by the aggregation router/gateway 130. The phone call may then be transferred to an internal network at the user's location, e.g., the network 150 of user 148 or private branch exchange ("PBX") 160 of user 140, which may distribute the phone call to various devices within the user location, e.g., PBX extension telephone 164, IP phone 152, personal computer 154, network facsimile 156 and network attached storage 158.

For example, a third party may be attempting to make a voice phone call from a POTS device (not shown) to the user 148. The third party will dial a phone number that is related to the user 148. As will be described in greater detail below, each user 140-148 may have one or more traditional phone numbers that may be used to contact the user. The phone call placed by the third party will be routed via the PSTN 123 to the PSTN-IP Gateway 120 of the platform 100. The analog phone call will be converted to a digital signal by the PSTN-IP Gateway 120 and the digital signal will be processed by the various platform 100 resources. The signal will be routed through aggregation router 130 to the communication link 133 and directed to the network 150 of the user 148. Since this communication is a voice communication, the network 150 may then direct the data packets for the phone call to the EP phone 152 which converts the digital signal into an audio signal for the user to converse with the third party caller. As will be described in greater detail below, users 140-148 may select the location (or device) to which voice and/or data communications are to be directed, including simultaneously directing communications to multiple devices that are either directly or indirectly connected the platform 100. This entire exemplary communication takes place in the same real time manner as a normal POTS line to POTS line phone call. The fact that the signal is converted to data packets is transparent to both the user of the IP phone 152 and the third party caller.

Conversely, users 140-148 may initiate the telephone call to a third party's POTS device (not shown). The telephone call would traverse platform 100 in a similar manner described in the example above.

Platform 100 may be used to provide services to telephone calls that originate and terminate on the PSTN 123. In this scenario, the telephone call is not originally destined to enter platform 100. However, through various techniques, a telephone call between two parties outside of platform 100 may be redirected through platform 100 so that services may be delivered. These techniques are described below.

One method of redirecting a telephone call may employ call forwarding (CF, CFB, CFNA) and distinctive ring services available from many local telephone companies. The subscriber's telephone service is provisioned with call forwarding and distinctive ring services. Calls to that subscriber's telephone number may then be redirected to the platform 100 using call forwarding. The platform 100 receives the incoming telephone call and automatically identifies the subscriber either through information provided by the telephone company (such as the ANI and DNIS) or based on information internal to the platform 100 (e.g., the platform 100 has a telephone number dedicated to that subscriber). Simultaneously with this identification, the platform 100 places an outbound telephone call to the subscriber's distinctive ring number. The distinctive ring number does not have call forwarding provisioned and rings the subscriber's POTS device in the usual manner. Alternatively upon receiving the forwarded telephone call, platform 100 may disable the subscriber's call forwarding service (by using a separate service provided by the subscriber's telephone company) and then place a call to the subscriber's telephone number which will ring in the usual way. Using either of these methods, the caller and the subscriber may have a telephone conversation with platform 100 providing services, such as speech to text conversion services that will be described further below.

Lawful intercept as defined by the Communications Assistance to Law Enforcement Act (CALEA) is another source of telephone calls that originate and terminate outside of platform 100 that may be redirected to flow through platform 100 where services such as speech to text conversion may be delivered. The law enforcement agency (LEA) may use platform 100 to convert the telephone conversation to text in the manner that is described below. Biometric information may be used to identify which party is speaking in a two-way or multi-way conversation, as will be described below.

Use of the platform 100 for lawful intercept and surveillance provides a middle ground between court orders authorizing Level 1 (where call progress data is provided to the LEA but not call content) and Level 2 (where call progress data and call content are both provided to the LEA) surveillance. The middle ground provided by platform 100 enables the LEA to monitor not just DTMF digits dialed but also search for keywords or phrases mentioned in the two-way or multi-way conversation without the LEA actually listening to the conversation. As will be described below, the speech to text conversion provided by platform 100 allows the conversation to be searched for keywords or phrases without divulging the conversation's substance.

Platform 100 may be used to provide voice mail services to subscribers. Incoming telephone calls may be destined for either users 140-148 or external POTS devices (not shown).

For external POTS devices, CFB or CFNA services may be used to redirect telephone calls into platform 100. In either situation, platform 100 answers the telephone call, plays the appropriate greeting and records the voice message. This voice message may be kept in audio form or converted to text in the manner described below.

Platform 100 may be used to retrieve audio-based information (such as voice mail) stored in an external system such as an individual's home answering machine, wireline or wireless service provider's voice mail system, a company's internal phone system's voice mail, financial account information accessed by telephone, or any other system that uses interactive voice response (IVR). IVR is a technology that will be familiar to those with skill in the art. The person with authority to access this voice mail (or general NR) system would provide to platform 100 the necessary login and authentication information and necessary permission for platform 100 to retrieve his personal information. To fetch external audio-based information, platform 100 places an outbound telephone call through the PSTN 123 to the third party's telephone access number. This telephone access number may be for a company's voice mail system, wireline or wireless telephone number or an individual's home telephone number. When the voice mail system associated with this telephone number answers the telephone call, platform 100 sends DTMF tones (or other audible commands) in order to authenticate and log into this third party's voice mail (or general IVR) system. Platform 100 may use speech recognition technology provided by ASR engine 115 to identify and decode audio prompts. For example, the audio prompt may be "Press one to access your voice mail." Platform 100 would have a predefined list of such common prompts and use this information to navigate through the menus of this third party voice mail (or general IVR) system. When this third party's voice mail (or general IVR) system plays the relevant audio information (such as the voice message), platform 100 may record that message. This technique of navigating the third party's system by recognizing and decoding the prompts and issuing DTMF commands may also be used to extract envelope information about the voice mail stored in the third party's system. Such envelope information may consist of date and time the message was delivered, the caller's phone number (or Caller ID), message length, urgency indicators, call back telephone numbers and other information. Once the audio information has been retrieved from the third party voice mail (or general IVR) system, platform 100 may issue DTMF commands to erase or archive the messages. Platform 100 may then present the retrieved messages and envelope information, either in audio form or converted to text, to the subscriber via email, web page or some other data transmission means. Those with skill in the art will understand that the above method may be implemented using VoiceXML technology (among other methods).

The third party IVR system described above may be one that is widely used by many service providers, or it may be a system whose characteristics (such as the menu structure) are not common but are already known by platform 100. In the former case, platform 100 may identify the system's vendor by using speech to text conversion described below and/or ASR engine 115 and biometric engine 119 to analyze the system's greeting messages and prompts and match those acoustical elements and sentence structures to a list of known vendors' system characteristics. Once the vendor is determined, the menu structure of the third party's system may be identified. Alternatively, in the latter case, platform 100 may keep track of the DTMF navigation codes that were previously used to retrieve information for a specific user. Through either means, platform 100 may improve the efficiency of message retrieval by navigating the menu structure by issuing DTMF commands without first listening to and decoding the entire message prompt. For example, if a user wishes to retrieve voice messages from the voice mail system provided by his wireless telephone company, platform 100 may use ASR engine 115 and biometric engine 119 to identify the wireless company's voice mail system. Alternatively, platform 100 may retrieve from a database the previously successful DTMF codes used for this user's system. Knowing this, platform 100 identifies the system's menu navigation structure. Now, instead of listening and decoding a lengthy message prompt, platform 100 knows which DTMF signal to send and may preempt the message prompt. Through such a method, message retrieval may be accelerated.

Voice mail may also be retrieved from an external source by platform 100 by using a direct interface connection. For example, a PBX with voice mail server may have a proprietary interface, Foreign Exchange Subscriber (or Foreign Exchange System) (FXS) ports and/or Foreign Exchange Office (FXO) ports. Platform 100 may be configured to connect directly to an external PBX, such as PBX 160 depicted in customer premises 140 using such interfaces. In this configuration, platform 100 may have complete information about voice mail stored on voice mail server 162 and extract both the message and envelope information directly. The message and/or envelope information may be converted to text for delivery to the subscriber by email or other digital means. The conversion to text is described below.

Platform 100 may have its own dedicated local access telephone numbers that may be used by individuals to access services provided by platform 100. One of these services may be dictation. The user may call a telephone number that converts the user's speech to text in the speech to text conversion manner described below.

Platform 100 may be used as a conferencing bridge that connects multiple parties using the conference bridge 106. For these conference calls, platform 100 may also provide speech to text conversion where each conference participant is identified through biometric techniques. This speech to text conversion and biometric identification process is described below.

Platform 100 services may also be obtained in batch mode where audio files are delivered by email or uploaded through FTP or other means to platform 100. For example, one or more audio files may be sent by email to platform 100 for processing. Platform 100 converts the audio files to text files and returns the result(s) to the sender by email or other means.

Data transmissions from the public internet 128 (or any other communications network) may be touted to the platform 100 through firewall and router 125 which protects the platform 100 from unwanted access. These data transmissions are already in digital form (e.g., data packets) and are passed via Ethernet 110 (or similar data network) to the components of the platform 100 for processing.

Those of skill in the art will understand that the communication traffic (voice and data) may flow in either direction through the platform 100. Thus, in addition to the examples described above, a user 140-148 may place a voice phone call that gets directed to the PSTN 123 or send an email that gets directed to the public internet 128. Similarly, users 140-148 may communicate directly via the platform 100.

Those of skill in the art will understand that platform 100 may be a dedicated system or a multi-tenant system. As a dedicated system, platform 100 is used to provide services solely to one company or user. As a multi-tenant platform, a multitude of customers or companies share the resources of platform 100 and each customer or company keeps its records and account information separate from the rest.

Speech to Text Applications:

As described above, the VoIP platform allows for the implementation of various features and applications which enhance the phone service of users. A first exemplary feature of speech to text applications, referred to as a transcription service, will be described. The speech may be in any form, for example, a recorded voice mail, a running conversation between two or more parties, a single party dictating, multiple individuals in a room conversing, etc. The text that is generated by these applications may be a text file which a user may store, view and edit or a real time scrolling text that is displayed on, for example, a CRT or LCD screen of a computing device. The exemplary embodiment of the transcription service according to the present invention will be described as being implemented on the exemplary platform 100 described with reference to FIG. 2. However, those of skill in the art will understand that the exemplary embodiment of the transcription service may be implemented on any platform through which audio data is streamed or where audio files are stored, including non-telephony related platforms.

Figure 3:
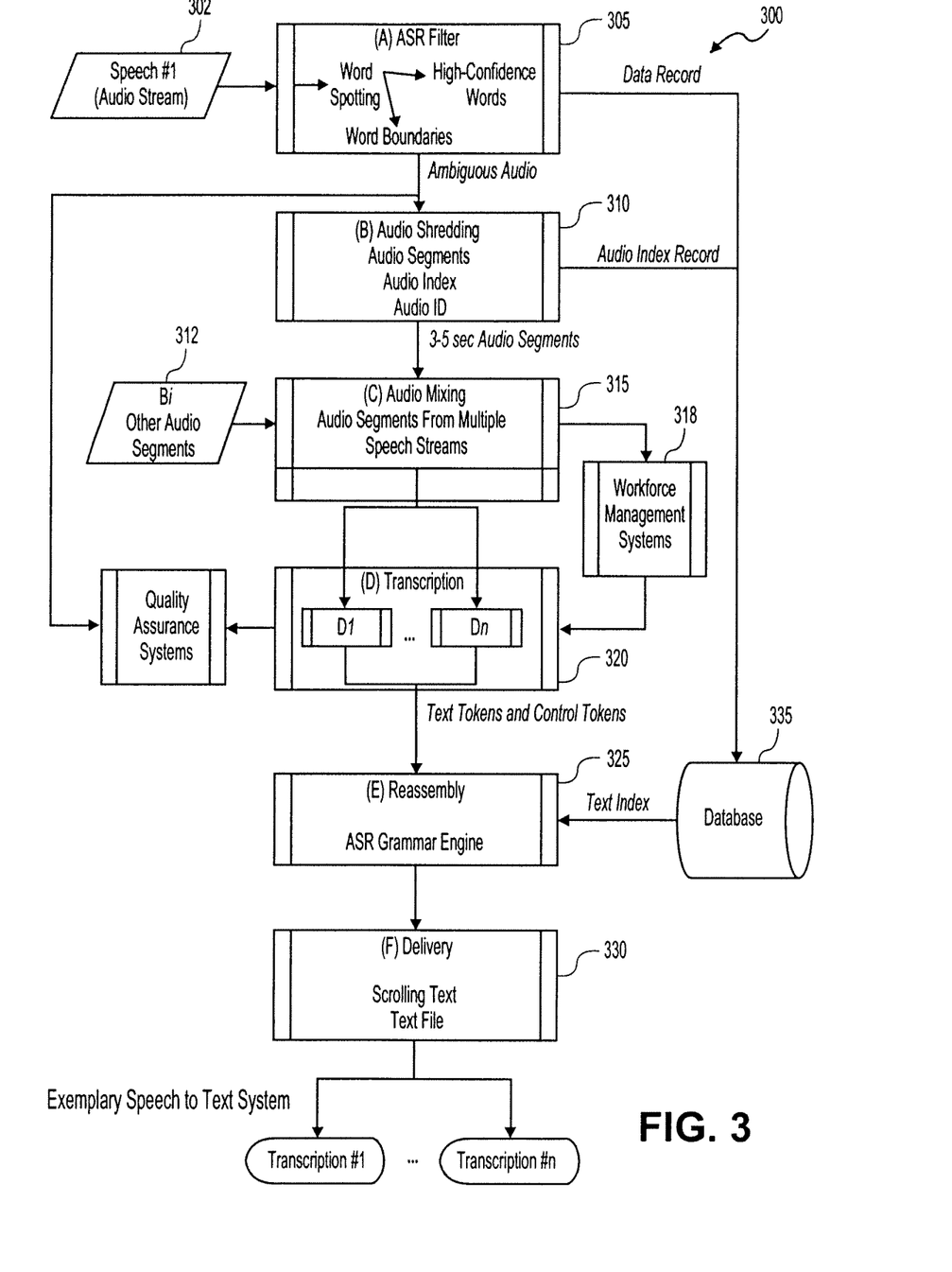
FIG. 3 shows an exemplary system for the transcription of speech to text according to the present invention.

FIG. 3 shows an exemplary system 300 for the transcription of speech to text. An audio stream 302 is input into an ASR filter 305. The audio stream may be pre-recorded or occurring in real time. If, for example, a conversation were between a user 148 using the IP phone 152 and a third party caller using the PSTN 123, the entire conversation would traverse platform 100. The user 148 may desire to have the conversation transcribed or saved in a text form. As the conversation is streaming through the platform 100, it may be acted upon by one or more of the various servers which provide the transcription service. It should be noted that the exemplary transcription service according to the present invention does not need to record or keep a record of the audio information.

Continuing with the above example of the user 148 on the IP phone 152 having a phone conversation with a third party caller, the user 148 may decide that the conversation should be transcribed and the user 148 may initiate the transcription service offered by the platform 100. The user may initiate the service in a variety of manners, for example, the IP phone 152 may have a button or key combination that when pressed sends a signal to the platform 100 to initiate transcription. In another example, the PC 154 may display a graphical user interface ("GUI"), e.g., a web page, showing the different features and functions offered by the platform 100. The GUI may include a feature that allows the user to click on a button to start the transcription service. When the user 148 sends the signal to the platform 100 to begin transcription, the signal may be received by, for example, the application server 102 which may implement the transcription service alone or in combination with the other resource servers. For example, the application server may access the database engine 101 to determine which user sent the transcription request, the ASR engine 115 in order to access the ASR services, the network server 103 to branch the packets associated with the correct conversation, the biometric engine 119 to identify the speakers, the accounting systems 122 to bill for the service, the workforce management systems 126 to send the audio shreds to various transcribers for processing, etc.

Referring back to FIG. 3, the ASR filter 305 may be, for example, the ASR engine 115 of platform 100. The ASR filter 305 may convert a portion of the raw audio into text using ASR techniques that are generally known. Since the speech is conversation quality, only a small portion of the conversation will be recognized by the ASR filter 305. A general technique used by ASR filters is to spot words and those words which are recognized with a high degree of confidence (e.g., 99% or greater) may be sent directly to a storage database 335. The text of the words that are sent to the database also include indexing information to allow the word to be placed back within the conversation at the correct location when the speech is reassembled. A more detailed description of the data structure for the indexing will be given below.

Figure 4:
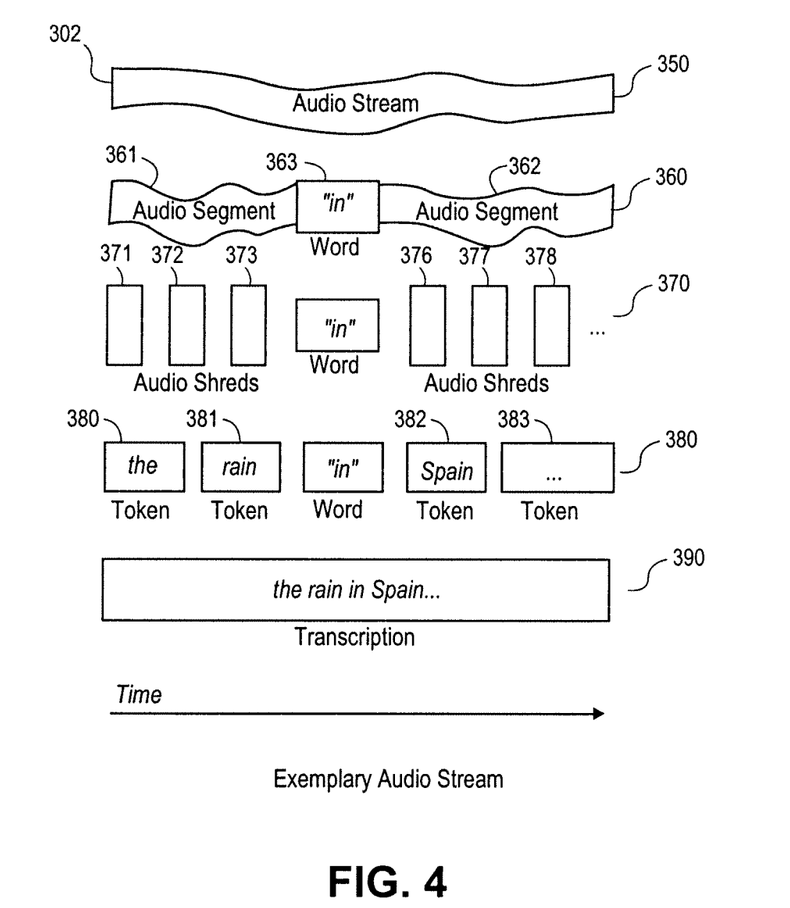
FIG. 4 shows an exemplary audio stream in the various stages as it is transformed into a transcription according to the present invention.
Figure 5:
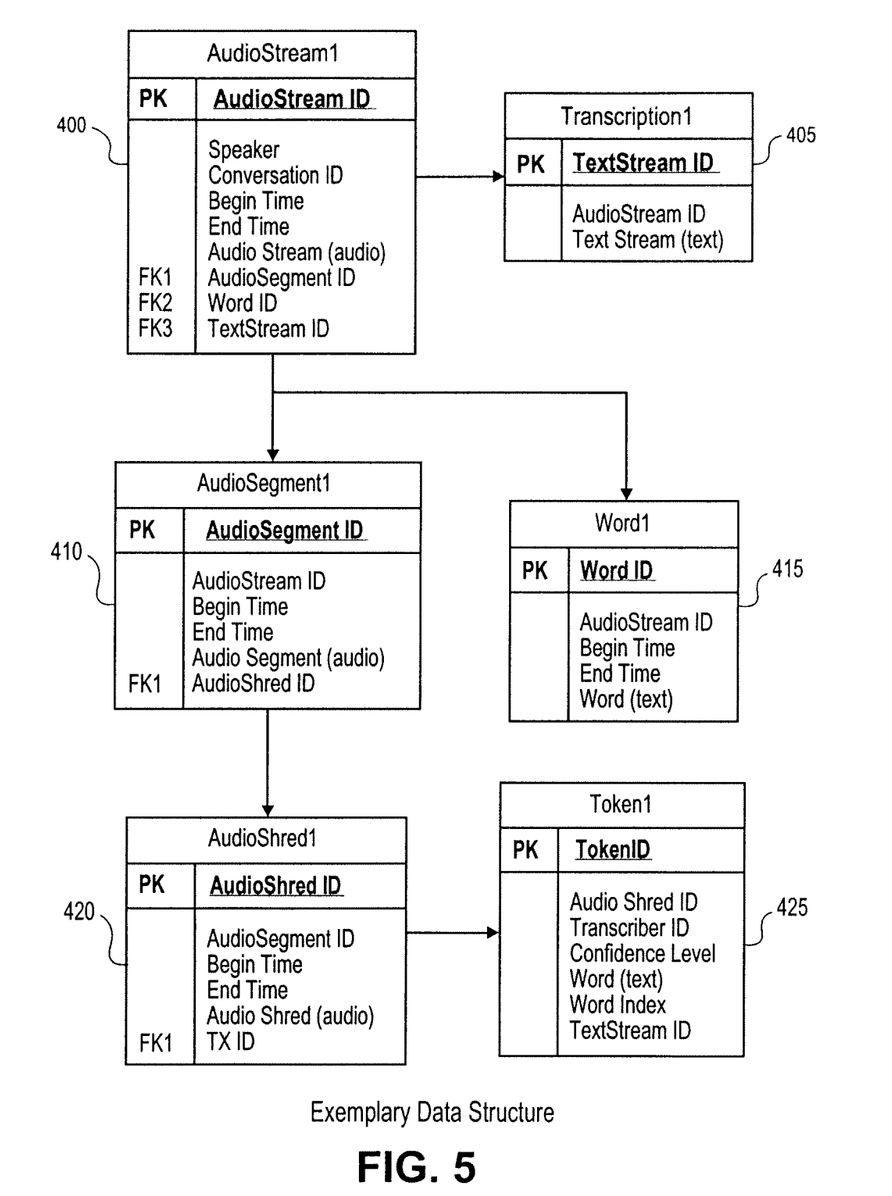
FIG. 5 shows exemplary data structures which may be used to index the data associated with the audio stream as it is transformed into the transcription according to the present invention.

FIG. 4 shows an exemplary audio stream 302 in the various stages 350-390 as it is transformed into text. FIG. 5 shows exemplary data structures 400-425 which may be used to index the data associated with the audio stream 302 as it is transformed into the text. In this example, the audio stream 302 in stage 350 is a representation of the speech "the rain in Spain." The audio stream 302 may have an associated data structure 400 (FIG. 5). The data structure 400 may be any type of data structure, for example, a database record, an array, a table, a linked list, etc. The data structure 400 may be stored in the database 335 (FIG. 3) or any other storage location that may be accessed by the platform providing the transcription service. Those of skill in the art will understand that the data structure 400 and the other data structures described are only exemplary and it may be possible to use different data structures to implement the exemplary embodiment of the present invention.

The data structure 400 for audio stream 302 may be assigned an AudioStreamID (e.g., AudioStream1) and include information such as the speaker ID, the conversation ID, the begin and end time of the audio stream 302, and the actual audio stream 302. Audio that is coming from a specific device (e.g., the IP phone 152) may be ascribed to a single user that is associated with that device. If the speaker is the third party caller, the speaker ID may be associated with the telephone number of the third party caller. As described above, the platform 100 has the ANI information (in the case of a third party caller) or the DNIS information (in the case of the third party receiving the call) so the speaker ID may be the third party number (e.g., speaker from 555-1000). In the case where there are multiple parties on a speaker or conference phone, a speaker identification system, for example, based on biometrics provided by biometrics engine 119 (FIG. 2), may be used to identify the party speaking (e.g., speaker "A" from conference line 555-8000).

The conversation ID may be used to identify the audio stream with the particular conversation from which it came. For example, the audio stream 302 "the rain in Spain" may be only a small portion of a conversation which contains hundreds or thousands of words. For the transcription to be accurate, the transcription of every audio stream in the conversation needs to be indexed to the conversation. Thus, every audio stream from the conversation will index back to the conversation ID. The begin time and end time of the data structure are also used to index to the correct conversation because not only do all the words from the conversation need to be identified with the conversation, but the words need to be assembled in the correct temporal order to have an accurate transcription. The time information may be indexed to absolute time (e.g., day/time) as kept by the platform or as some relative time (e.g., time as measured from the start of the conversation). The exemplary embodiment of the transcription service will use (or process) the actual audio stream 302 to create the transcription of the audio. The audio segment ID, word ID and TextStream ID of the data structure 400 will be described in detail below.

Referring back to FIG. 3, the exemplary audio stream 302 may be input into the ASR filter 305. In this example, the ASR filter 305 recognizes one word of the audio stream 302, i.e., "in" 363 as shown in stage 360 of FIG. 4. A text representation of the word "in" and indexing information for the word may then be stored in the database 335 for when the speech is later reassembled. The data structure 415 for the stored word is shown in FIG. 5. The data structure 415 may be assigned a WordID and include the AudioStreamID from which the word was identified (e.g., AudioStream1), the beginning and end time of the word, and the actual text file for the word, e.g., "in". Once again, this word index will be used at a later time to reassemble the conversation into the transcription. Each word that is identified by the ASR 305 will have a separately stored data structure in database 335. The data structure 400 for the audio stream 302 may also store (or have a pointer to) the WordID for each word in the audio stream 302.

The result of the audio stream 302 being input into the ASR filter 305 is that the audio stream is broken into recognized words and ambiguous audio segments. Referring to FIG. 4, this is shown in stage 360 where the recognized word "in" 363 separates two ambiguous audio segments 361-362. The recognized words (e.g., "in" 363) set up word boundaries which separate the ambiguous audio segments as shown in stage 360. Each of the audio segments 361-362 also has an associated data structure 410. The data structures 410 for the audio segments 361-362 are each assigned an AudioSegmentID (e.g., AudioSegment1 and AudioSegment2) and the data structure includes the AudioStreamID of the audio stream from which the segment is derived, the begin and end time of the audio segment and the actual audio segment. In this example, the begin time of the first audio segment 361 is the begin time of the audio stream 302 from which it is derived and the end time is the begin time of the identified word 363. For the second audio segment 362, the begin time is the end time of the identified word 363 and the end time is the end time of the audio stream 302 from which it is derived. The AudioShredID will be described in greater detail below. The data structure 400 for the audio stream 302 may also store (or have a pointer to) the AudioSegment ID for each audio segment in the audio stream 302. Thus, the initial audio stream has been segmented into identified words and ambiguous audio segments.

Referring back to FIG. 3, the ambiguous audio segments (e.g., the segments 361-362) may then be directed to an audio shredder 310 which breaks the ambiguous segments into multiple audio shreds, for example, one to ten second audio segments, and more preferably three to five second audio segments, or shreds. However, the duration of the audio shreds is adjustable and may be set to accommodate the longest possible words, but short enough to eliminate all context from the conversation. A similar ASR engine as used for ASR filter 305 may be used to implement the audio shredder 310. However, in this case, the ASR engine will not identify specific words, but may identify pauses between words, i.e., word boundaries. In the ideal case, each audio shred will start at the beginning of a word and end at the end of a word. The beginning and end may be the same word or it may be multiple words. There may be instances where multiple words are preferred because it may be easier to transcribe the audio of several words rather than just one.

The audio shreds may overlap, i.e., the same portion of an audio segment may appear in two audio shreds. This may add fault tolerance to the audio shreds. For example, while the audio shredder 310 attempts to break the shreds at word boundaries, it may not always be successful and an audio shred may contain only a portion of a word in the audio stream making the word unrecognizable. However, an overlapping shred may contain the entire word making it possible to correctly reconstruct the conversation. The overlapping shreds may also be used as an accuracy check. For example, the same word may appear in two audio shreds which are sent to two different transcribers. If both transcribers accurately transcribe the word, there is a higher degree of confidence in the accuracy of that word as opposed to a single transcriber transcribing the word. If, on the other hand, the two transcribers disagree, there may be a series of checks and/or processes that can be used to determine which word is correct. Such comparisons may also be used to assess the accuracy of the transcribers.

Referring to FIG. 4, stage 370 shows that the audio segments 361-362 of stage 360 have been shredded into the audio shreds 371-373 and the audio shreds 374-378, respectively. Each of the audio shreds is indexed and the index information is stored in the database 335 in, for example, the data structure 420 of FIG. 5. There is a data structure 420 for each audio shred and each data structure is assigned an AudioShredID, the data structure including the AudioSegmentID of the audio segment from which the shred is derived, e.g., the audio shred 371 will contain the AudioSegmentID of the audio segment 361. The data structure 420 may also include the beginning and ending time for the audio shred and the actual audio of the shred. Once again, this information for the audio shred may be used later to reassemble the audio stream 302. The data structure 410 for the audio segments may also store (or have a pointer to) the AudioShredID for each audio shred in the audio segment.

Referring back to FIG. 3, the audio shreds may be input into an audio mixer 315 and randomized with audio shreds from other audio streams 312 from multiple conversations. Thus, an audio shred from a real time conversation may be randomized with an audio shred from a different conversation, from a voice mail recording, etc. As described above, the short duration of the audio shreds removes the context from each of the audio shreds. The process of mixing the audio shreds with other random audio shreds assures that the transcribers who hear the audio shreds (discussed below) cannot reassemble any one conversation from memory because the transcribers are only hearing random shreds of multiple audio streams from multiple conversations.

The multiple audio shreds are then transmitted to live agent transcribers 320 who may listen to the audio shreds and type the corresponding audio word into text. The workforce management systems 318 (which correspond to workforce management systems 126 of FIG. 2) may determine which transcriber receives the audio shreds based on a number of criteria along with monitoring transcriber status (e.g., available, working, unavailable, etc.) and performance metrics such as accuracy and speed. For example, the platform 100 may have one hundred simultaneous two-way conversations which are being transcribed. The audio mixer 315 is randomizing audio shreds from each of these one hundred conversations. The audio mixer sends these audio shreds to the transcribers 320 in order to have the text associated with the shreds transcribed. There is no need to centrally locate the transcribers 320. Each of the transcribers 320 may be located in a different location which is remote from the other transcribers and from the platform 100. The minimal requirements are a data connection to platform 100 and appropriate computing hardware and software for receiving audio shreds. For example, the transcribers 320 may receive the audio shreds over a data connection (e.g., internet dial-up access) in a manner similar to the delivery of electronic mail.

Platform 100 may also use the ASR filter 305 to transcribe an audio stream 302 directly. Since the accuracy of such computer-generated transcription may not be high, platform 100 would still perform the audio shredding tasks described above. However, instead of sending the audio shreds to the agent transcribers 320 for transcription, the agent transcribers 320 would instead proofread the text generated by the ASR filter 305 and compare it with the original audio shred. The audio shred and ASR-generated text would be delivered to the agent simultaneously. The agent transcribers 320 may then accept the computer generated text as accurate or make necessary corrections. This proofreading service may be used to improve the efficiency of the agent transcriber 320 while still keeping the speech to text conversion process, described above, secure.

As mentioned above, transcribers need not be physically located in any one place. The transcribers could comprise a distributed workforce located in various countries around the world where each transcriber works as an independent contractor from home. Transcribers may also belong to groups that work in the same facility, as in a traditional call center business. A multitude of such groups and at-home agents would comprise the distributed workforce, managed by platform 100, providing speech to text conversion services.

The client application used by the transcribers would include audio and data channels. The audio channel could deliver either streamed, real-time speech or stored, pre-recorded speech. This delivery may be via an Internet connection to a media player, email client or web browser. For example, streamed audio may be played by the PC directly using a third party's media player software and retrieved via a web browser; and, stored audio may be retrieved using a third party's email program. The data channel may be an Internet connection that connects a program running on the transcriber's computer to platform 100, a web browser connection to platform 100, or an email connection to platform 100.

The workforce management systems 318 will monitor which transcribers 320 are available and direct an audio shred to an available transcriber 320. When the transcriber 320 receives the audio shreds, the transcriber control will indicate that the transcriber is working and the transcriber 320 will not receive additional audio shreds until the transcriber finishes with the current audio shred. In addition, the transcriber control 318 may monitor the number of audio shreds from a single conversation that a particular transcriber receives in order to assure that the individual transcriber may not piece together the conversation. The transcriber 320 may receive the audio shred in the form of data packets that are sent to a PC the transcriber 320 is using. The data packets may include the data structure 420 for the audio shred, including the actual audio for the audio shred. The audio may be played, for example, via a media player on the PC and as the transcriber 320 hears the word or words in the audio shred, the text for these words may be typed into the PC, for example, via a dialog screen. The transcriber 320 may also receive the audio shred through a telephony device. The audio shred may be played through a telephone handset or headset and the transcriber 320 enters the corresponding text using a PC.

As the transcriber is typing in the words, a data structure 425 is created for the text which is entered. This text may be referred to as a token. Thus, the data structure 425 is assigned a TokenID and may include the AudioShredID from which the token was transcribed, the identification of the transcriber (TranscriberID), a confidence level (i.e., the level of confidence of the transcriber 320 that the transcription was accurate), the actual text of the word or words and a word index. There may be cases of ambiguities such as inaudible words where the transcriber 320 cannot accurately enter the text corresponding to the spoken word. In these cases, the transcriber 320 may enter an error code which indicates problems such as an error in the transmission (e.g., static), homonym ambiguities, inaudible speech, etc. The transcriber 320 may adjust the confidence level commensurate with such errors. For example, if there was static in the audio shred, the transcriber may enter a code corresponding to static and a confidence level of zero (0) indicating there is no confidence in the transcription because of the error. The data structure 420 for the audio shreds may also store (or have a pointer to) the TokenID for each token in the audio shred.

Thus, at this point each word in the original audio stream 302 is in text form. Referring to stage 380 of FIG. 4, the text of the words were either determined by the ASR filter 305 and stored in the form of a word data structure 415 in database 335 or determined as part of a token by the transcribers 320. These data structures containing the actual text of the words and the associated indexing information are input into the reassembler 325 where the words and tokens are reassembled. As described above, each of the words and tokens are indexed to the audio stream and their location within the audio stream and this indexing information may be used to reassemble the text into a coherent text representation of the audio stream. Those of skill in the art will understand that the indexing information from the words (data structure 415), the tokens (data structure 425) and the other data structures 400, 410 and 420 may be combined in order to correctly reassemble the audio stream.

As described above, in some instances the audio shreds will overlap, thus the text from the corresponding tokens will also overlap. The reassembler 325 may eliminate these overlapping words to accurately reflect the conversation. In addition, where the transcriber entered an ambiguity, the reassembler 325 may compare the overlaps to eliminate the ambiguities. The reassembler 325 may also contain a grammar engine which aids in the reassembly of the audio stream. For example, a word or token may contain a homonym, e.g., by and buy. The grammar engine may resolve such ambiguities as the text file is being created.

The output of the reassembler 325 is a text stream having the data structure 405 as shown in FIG. 5. The text stream is assigned a TextStream ID and includes the AudioStreamID of the audio stream from which the text stream is derived and the actual text of the text stream. The stage 390 of FIG. 4 shows the transcription output of the exemplary audio stream 302. The reassembler 325 not only reassembles the audio streams, but also reassembles the conversations from which the audio streams are derived. Thus, the text stream output may include the entire conversation, not just the single audio stream. The output of the reassembler 325 is sent to a delivery module 330 which delivers the text output in the manner prescribed by the user, e.g., a text file, scrolling text, RSS protocol, a Microsoft Word document, formats specific to courts of law or government bodies, etc.

The workforce management systems 318 may employ heuristic methods to identify a group of transcribers that are most suited to transcribing audio streams 302 from a class of speakers. Selection criteria may include knowledge of specialized terms (such as medical or legal terminology), prior success in accurately transcribing a user's speech or skill with a foreign language, dialect or regional accent. The class of speakers may be defined as those individuals from a specific profession (such as doctors, lawyers, etc.), a specific speaking pattern or accent (such as individuals from the Southern, New England or Mid-West regions of the United States), or foreign language (such as German, Spanish or Italian speakers).

The transcription service described here may be for any foreign language. The user may indicate his language during the setup of the transcription service or the speaker's language may be identified through trial and error techniques. For example, an audio shred may be sent to one or more transcribers. If the audio shred is not understandable to those transcribers, the system may send that audio shred to many different transcribers, each specializing in a different language. The transcribers that return a non-ambiguous result will thereby identify the speaker's foreign language. In addition, the ASR engine 115 may have grammar libraries for multiple foreign languages and also be used to identify which language a speaker is using. Upon conversion of the foreign language speech into text, the text document may be translated into any other language by standard means. For such translation applications, the speech to text service described here becomes the necessary preprocessor of the speech.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A system, comprising:
a receiving element to receive a) audio streams and b) text that has been generated by a speech recognition element acting upon the audio streams, the receiving element to create a audio segments from the audio streams, and b) text segments, corresponding to the audio segments, from the text;
a mixing element to receive the audio segments and to randomize the order of the audio segments and the corresponding text segments;
a transmitting element to send the randomized audio segments and the randomized corresponding text segments to a plurality of transcribers; and
a text receiving element to receive corrected text segments created by the plurality of transcribers using a) the transmitted randomized audio segments and b) the transmitted randomized corresponding text segments.

2. The system of claim 1, further comprising:
a reassembling element to receive, reorder, and combine the text segments generated by the speech recognition element and the text segments corrected by the transcribers, to create a text file corresponding to one of the audio streams.

3. The system of claim 2, wherein the generated text segments and the corrected text segments include indexing information, the reassembling element to use the indexing information to create the text file.

4. The system of claim 1, further comprising:
a database element which stores the text segments corresponding to each of the audio segments, the database element further storing indexing information for the text segments.

5. The system of claim 1, wherein the transmitting element has a connection with an audio channel and a data channel to each of the transcribers for sending the randomized audio segments and the randomized corresponding text segments.

6. The system of claim 1, wherein the transmitting element sends the randomized audio segments and the randomized corresponding text segments to the transcribers simultaneously.

7. The system of claim 1, wherein any one of the text segments sent to the transcribers that is accurate is to be indicated as acceptable by the transcribers, and any one of the text segments that is inaccurate is to be corrected by the transcribers.

8. The system of claim 1, further comprising:
the speech recognition element to receive the audio streams and to transcribe the audio streams into text.

9. A method, comprising:
creating audio segments from audio streams;
creating text segments corresponding to the audio segments;
randomizing the order of the audio segments and the corresponding text segments;
sending the randomized audio segments and the randomized corresponding text segments to a plurality of transcribers; and
receiving corrected text segments created by the plurality of transcribers from the sent randomized audio segments and the sent randomized corresponding text segments, wherein each corrected text segment contains a correction made by one of the plurality transcribers to an inaccuracy in the sent randomized corresponding text segment.

10. The method of claim 9, further comprising:
storing the created text segments corresponding to the audio segments in a database; and
storing indexing information for the created text segments.

11. The method of claim 9, further comprising:
receiving indexing information for the corrected text segment from the transcriber.

12. The method of claim 9, further comprising:
reassembling and reordering the text segments and any corrected text segments to create a text file corresponding to each of the audio streams.

13. The method of claim 12, wherein reassembling and reordering the text segments and any corrected text segments to create a text file comprises:
using indexing information for the created text segments and any corrected text segments to create the text file.

14. The method of claim 9, wherein sending the randomized audio segments and the randomized corresponding text segments to the plurality of transcribers comprises:
sending the randomized audio segments and the randomized corresponding text segments to the plurality of transcribers simultaneously.

15. The method of claim 9, wherein sending the randomized audio segments and the randomized corresponding text segments to the plurality of transcribers comprises:
sending the randomized audio segments to a plurality of transcribers via an audio channel of a connection; and
sending the randomized corresponding text segments to the plurality of transcribers via a data channel of the connection.

16. The method of claim 9, further comprising:
transcribing the audio streams into text, wherein the text segments are created from the transcribed text.

17. A system, comprising:
a receiving element to receive a plurality of audio streams and text generated by a speech recognition element, the receiving element creating audio segments from the plurality of audio streams, and text segments corresponding to the audio segments from the text;
a mixing element to receive the audio segments and the corresponding text segments from at least two of the plurality of audio streams and to randomize the order of the audio segments and the corresponding text segments from the at least two audio streams to create randomized audio segments and randomized corresponding text segments;

transmitting element to send the randomized audio segments and the randomized corresponding text segments to a transcriber; and a text receiving element to receive corrected text segments created by the transcriber from the transmitted randomized audio segments and the transmitted randomized corresponding text segments.

18. The system of claim 17, further comprising:

the speech recognition element to receive the plurality of audio streams and to transcribe the plurality of audio streams into text.

19. The system of claim 17, further comprising:

a reassembling element to receive and combine the text segments generated by the receiving element and the corrected text segments created by the transcriber, to create at least two text files corresponding to the at least two of the plurality of audio streams.

20. The system of claim 17, wherein the receiving element creates audio segments having a short duration that removes context from each of the audio segments.

* * * * *